United States Patent [19]

Kumazaki

[11] Patent Number: 4,675,141

[45] Date of Patent: Jun. 23, 1987

[54] METHOD OF CONTROLLING PRESSURIZED GAS, BEFORE AND AFTER INJECTING A MOLTEN MATERIAL, IN A MOLD CAVITY

[75] Inventor: Hiroshi Kumazaki, Numazu, Japan

[73] Assignee: Toshiba Kikai Kabushiki Kaisha, Tokyo, Japan

[21] Appl. No.: 788,534

[22] Filed: Oct. 17, 1985

Related U.S. Application Data

[63] Continuation-in-part of Ser. No. 663,139, Oct. 22, 1984, abandoned.

[30] Foreign Application Priority Data

Oct. 24, 1983 [JP] Japan .................................. 58-198466

[51] Int. Cl.$^4$ .............................................. B29B 13/00
[52] U.S. Cl. .................................. 264/40.3; 264/40.5; 264/40.6; 264/85; 264/328.2; 264/328.14; 425/143; 425/144; 425/149
[58] Field of Search ................ 264/40.3, 40.5, 85, 264/297.2, 328.1, 40.6, 50, DIG. 83, 328.2, 328.14; 425/135, 143, 144, 149, 150

[56] References Cited

U.S. PATENT DOCUMENTS

| | | | |
|---|---|---|---|
| 3,044,118 | 7/1962 | Bernhardt et al. | 264/85 |
| 3,356,130 | 12/1967 | Mellen et al. | 425/144 |
| 3,642,402 | 2/1972 | Hutchinson et al. | 425/144 |
| 3,767,339 | 10/1973 | Hunkar | 425/149 X |
| 3,920,367 | 11/1975 | Ma et al. | 425/149 |
| 4,066,725 | 1/1978 | Boettner | 264/40.3 |
| 4,208,176 | 6/1980 | Salerno | 425/144 |
| 4,333,901 | 6/1982 | Young et al. | 264/85 |
| 4,436,679 | 3/1984 | Winstead | 264/40.3 |

FOREIGN PATENT DOCUMENTS

| | | | |
|---|---|---|---|
| 47-20251 | 9/1972 | Japan | 264/85 |
| 0113539 | 9/1980 | Japan . | |

Primary Examiner—Jan H. Silbaugh
Assistant Examiner—Harold Y. Pyon
Attorney, Agent, or Firm—Stevens, Davis, Miller & Mosher

[57] ABSTRACT

A molten resin to be injected into a mold cavity in use of an injection molding machine has a temperature, i.e. viscosity difference between at the injection starting point and the injection completing point. In order to eliminate or make small this difference, a high temperature and highly pressurized gas, preferably an inert gas, is preliminarily supplied to and sealed in the mold cavity and the pressure of the supplied gas is continuously controlled in accordance with the position of the screw during the injection molding operation thereby to maintain the temperature of the supplied gas in the mold cavity to be higher than the softening temperature of the molten resin to be injected.

4 Claims, 3 Drawing Figures

METHOD OF CONTROLLING PRESSURIZED GAS, BEFORE AND AFTER INJECTING A MOLTEN MATERIAL, IN A MOLD CAVITY

This is a continuation-in-part application of U.S. patent application Ser. No. 663,139, filed Oct. 22, 1984 now abandoned.

BACKGROUND OF THE INVENTION

This invention relates to an injection molding method, and more particularly, to a method for continuously controlling the pressure of a gas preliminarily supplied to a mold cavity to thereby suitably maintain the temperature of the gas.

In the molding field, one of the most important requirements to obtain a high quality mold product resides in a temperature a difference, i.e. a difference in viscosities of a molten material, usually resin, at an injection starting point and at an injection completing point, and it is required to make small the viscosity difference of the molten resin at the injection starting and completing points.

With this in mind, in the well known art, the viscosity difference of the molten resin is made small generally by injecting the molten resin at considerably high speed into the mold cavity to shorten a time required for the injection. However, in this known technique, a hydraulic pump having a large capacity or a large sized accumulator to forcibly inject the molten resin into the mold cavity at a high speed is required. This unnecessarily enlarges the whole structure of an injection molding machine, and moreover, high speed injection may generally increase the occurrence of defective products with undesirable deformation and cracks. In addition, the high speed injection further requires a highly accurate response to the injection molding system such as for quickly switching the injection process from filling resin to holding a pressure, and such requirement of the high response to the injection molding control system includes various high leveled techniques and technical problems.

SUMMARY OF THE INVENTION

An object of this invention is to provide an improved injection molding method capable of eliminating defects of the prior art technique and to control a highly pressurized gas or air preliminarily supplied to a sealed mold cavity in accordance- with a suitable control mode, whereby a molten material injected into the mold cavity has substantially the same viscosity as that of the molten material before the injection even when the molten material is not injected at a high speed thereby to obtain a mold product having good quality with no set.

For achieving this and other objects, according to this invention, there is provided a method of injecting a molten resin into a mold cavity in use of an injection molding machine in which the molten resin is injected from a heating cylinder by an injection screw located therein and in which a pressurized gas is preliminarily supplied to and sealed in the mold cavity, the method being particularly characterized in that a pressure of the pressurized gas supplied to the mold cavity is continuously controlled in accordance with the position of the screw during the injection molding operation thereby to maintain the temperature to be higher than a softening temperature of the molten resin to be injected.

According to this invention, since a high temperature and highly pressurized gas is preliminarily supplied to the mold cavity before the molten resin is injected thereinto and the temperature of the pressurized gas is maintained in the mold cavity to be higher than the softening point of the molten resin by the continuous control of the pressurized gas supplied to the mold cavity, the difference between the viscosities of the molten resin at the injection starting point and at the injection completing point is made significantly small, so that mold products having excellent quality with substantially no defects are obtained. In addition, the temperature and pressure of the supplied gas can be controlled to thereby control the viscosity of the molten resin being injected, and moreover, there is no need for using a hydraulic pump or accumulator with large capacity because it is not necessary for the injection molding machine to be driven at a high speed.

DESCRIPTION OF THE PREFERRED EMBODIMENT

Figure 1:
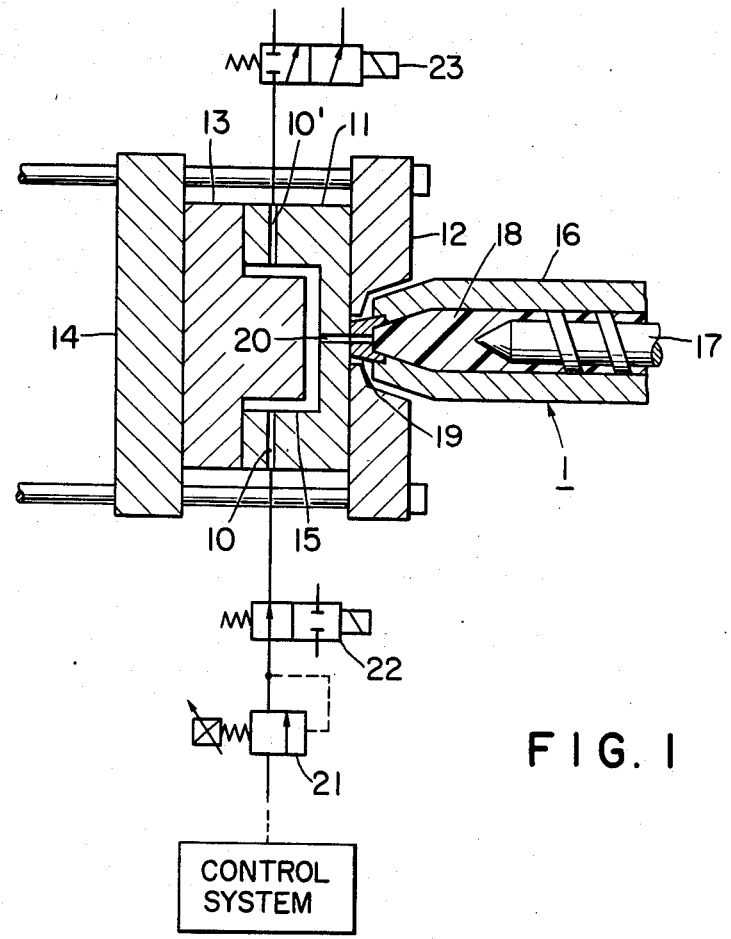
FIG. 1 shows a longitudinal sectional view of a mold and a part of an injection molding machine for carrying out a method according to this invention.

Referring to FIG. 1, which shows an injection start condition of an injection molding machine, a part of which is generally shown by reference numeral 1, a mold assembly comprises two mold halves, one being a stationary mold 11 and the other being a movable mold 13. The stationary mold 11 is secured to a stationary die plate 12, while the movable mold 13 is secured to a movable die plate 14 to be movable together in a horizontal direction as viewed in FIG. 1 by a mold clamping mechanism, not shown. When the stationary and movable molds are engaged, mold cavity 15 is formed therebetween as shown in FIG. 1. A molten material 18, such as molten resin, preferably ceramics, supplied to a heating cylinder 16 of the injection molding machine 1 is injected into the mold cavity 15 by an injection screw 17 located in the heating cylinder 16 through a nozzle member 19 attached to the front end of the heating cylinder 16 and a passage 20 formed in the stationary mold 11 by the leftward movement of the injection screw 17.

Before the injection molding operation, a high temperature and highly pressurized gas or air, preferably an inert gas such as nitrogen gas suitable for preventing oxidation of the molded products, is supplied, in a sealed condition, to the mold cavity 15 through passages 10 formed in the stationary mold 11 and externally through a pressure regulating valve 21 which is controlled by a control system described hereinafter in conjunction with FIGS. 2 and 3 and a change-over valve 22 operatively connected to a known gas or air generating source, not shown. It is of course required for supplied gas to have a temperature higher than the softening point of the resin to be used under a pressure usually higher than 5 kg/cm² to maintain the temperature of the mold cavity 15, particularly the surfaces thereof to have a considerably high temperature. Since the molten resin 18 is injected into the mold cavity 15 without lowering its temperature by the control of the pressure of the gas preliminarily supplied to the mold cavity, the viscosity of the injected molten resin 18 will not be substantially varied between at the injection starting stage and at the injection completing state. The highly pressurized gas in the mold cavity also acts on the front end of the injected molten resin 18 to prevent it from projecting through the passages 10 and 10' to thereby form a uniform shape of the front end of the molten resin 18 injected into the mold cavity.

The pressure of the gas to be supplied to the mold cavity 15 is controlled in accordance with or in response to the position of the screw 17, i.e. molten resin 18, or time elapsed during the injection operation, or the temperature or pressure of the molten resin 18. These operation controls will be able to be automatically carried out through the pressure regulating valve 21 by preliminarily programming data in a suitable programming means described hereunder.

An actual controlling of the gas pressure in the cavity 15, in FIG. 1, of the mold will be explained hereunder with reference to FIGS. 2 and 3 as one example according to this invention.

Figure 2:
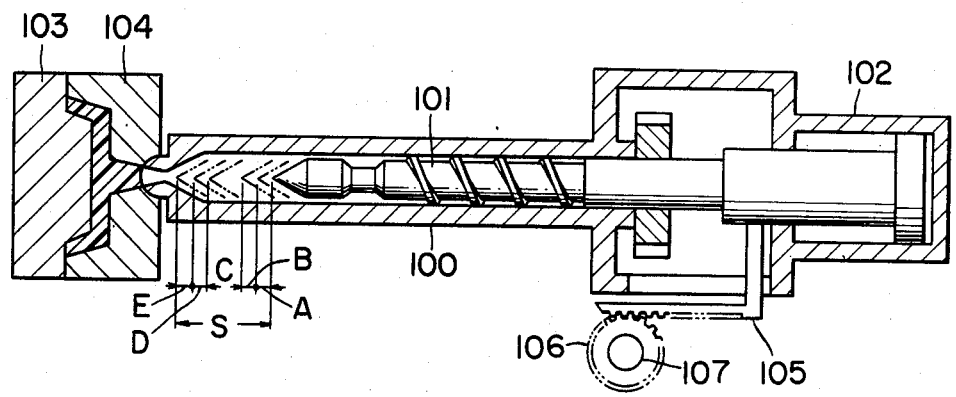
FIG. 2 shows a longitudinal sectional view of a whole injection molding machine including an injection screw to which a mechanism for detecting the screw position is connected.
Figure 3:
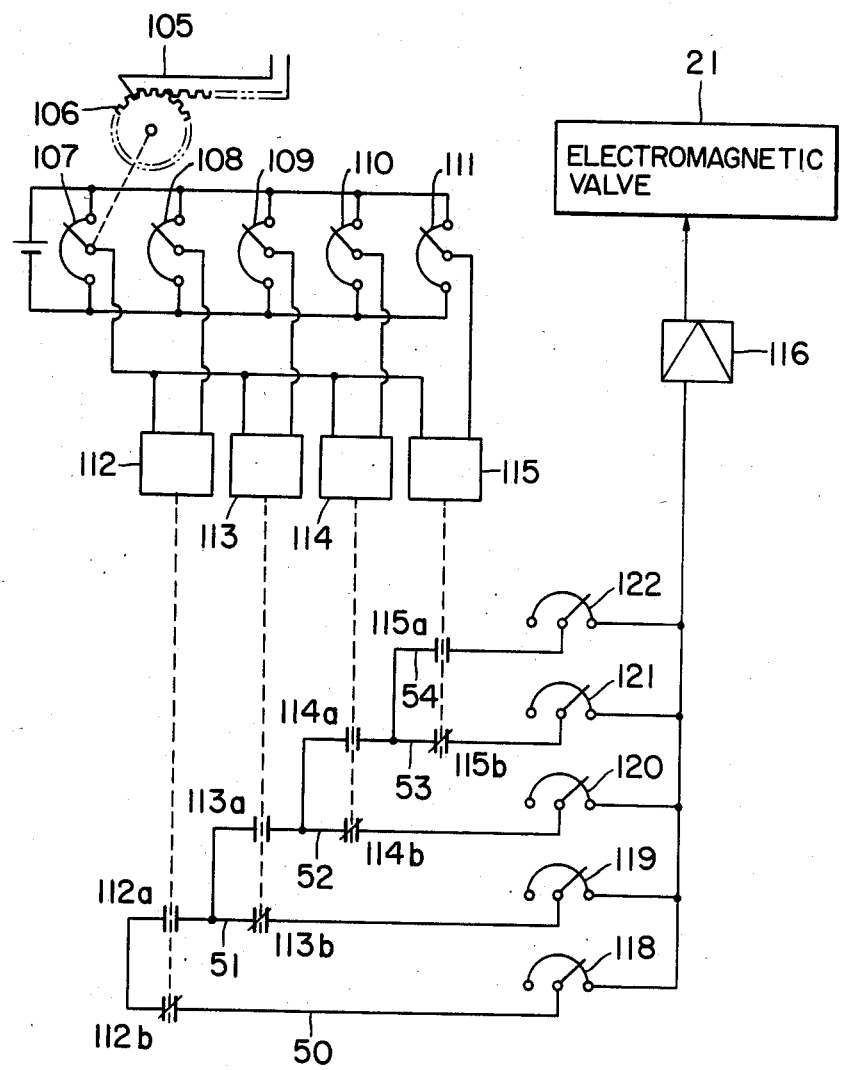
FIG. 3 shows a schematic diagram of a control system for controlling the gas pressure in the mold cavity of a mold assembly in response to the operation of the screw position detecting mechanism.

Referring to FIGS. 2 and 3, a screw 101 is driven by a hydraulic injection piston-cylinder assembly 102, and when the screw 101 is driven forwardly, a molten resin in the heating cylinder 100 is injected into a mold cavity formed by movable and stationary mold halves 103 and 104, which are briefly illustrated in comparison with those shown in FIG. 1. To the screw 101 is attached a rack member 105 to be movable in association therewith and a pinion 106 is disposed to be engageable with the rack member 105 to change the linear movement of the screw 101 to the rotary movement thereof through the engagement of the rack 105 and the pinion 106.

A potentiometer 107, in FIG. 3, is directly or indirectly through gear trains, not shown, connected to the pinion 106 to convert the moving distance i.e. linear movement amount into continuous electric signals. A letter S designates an injection stroke of the screw 10 which is divided into five stages A, B, C, D and E as shown in FIG. 2. The potentiometer 107 continuously changes a voltage to a certain predetermined value from the zero value in proportion to the moving distance of the screw 101 during the injection stroke S thereof.

A potentiometer 108 operates to set a voltage of the potentiometer 107 when the screw 101 advances by the stroke A, and in the same manner, potentiometers 109 through 111 operate to set voltages of the potentiometers when the screw 101 advances by the strokes A+B, A+B+C, and A+B+C+D, respectively. These potentiometers 108 through 111 constitute a position setting device for changing or switching the pressure of the gas supplied to the mold cavity. Signal transmitters 112, 113, 114 and 115 constituting a comparator operate to compare the voltages set in the potentiometer 108 through 111 with the voltage of the potentiometer 107 continuously changing in proportion to the movement of the screw 101 in the injection process and to generate signals when the compared voltages accord with each other through the operation of relay means, not shown, contained in the signal transmitters. The relay means are provided with contacts, respectively. These contacts 112a–115a and 112b–115b are operatively connected to potentiometers 118–122, which in turn are operatively connected to an amplifier 116 to amplify voltages set in the potentiometers 118–122. The potentiometers 118–122 operate the electromagnetic valve 21, shown in FIG. 1, with the preliminarily set voltages through the amplifier 116 when electric circuits 50–54 are switched in response to the signals generated from the transmitters 112–115, thus controlling the gas pressure in the cavity during the injection molding operation.

The actual operation will be described hereunder.

The electromagnetic valve 21 is first controlled by the voltage set in the potentiometer 118 arranged in the electric circuit 50 in response to the injection starting signal from the signal transmitter 112 to preliminarily set the gas pressure in the mold cavity to a predetermined value. This gas pressure in the mold cavity is possibly maintained during a time when the screw 101 advances in the heating cylinder 100 by the section A of the injection stroke S. At the completion of the passing of the screw 101 through the section A, the signal transmitter 112 generates a signal to switch the contact 112b to the contact 112a. Then, the electric circuit 50 is also switched to the electric circuit 51 thereby to control the electromagnetic valve 21 in response to the voltage in the potentiometer 119. According to the voltage in the potentiometer 119, the gas pressure in the mold cavity is changed to a predetermined value, which is then maintained during a time when the screw 101 advances in the heating cylinder by the section B of the stroke S. According to substantially the same manner as described above, the gas pressure in the mold cavity is automatically and continuously controlled by the voltages set in the potentiometers 120, 121 and 122 with respect to the sections C, D and E of the stroke S of the screw 101, respectively.

According to the control system described above, the gas pressure in the mold cavity is suitably changed or controlled in response to the movement of the screw, i.e. the position of the screw, so that the temperature of the gas can also be suitably maintained in the mold cavity.

It will of course be understood that in the foregoing description, the pressure is controlled by the position of the screw, but this pressure control may be performed in response to the injection speed of the screw or other parameters described hereinbefore.

Although pressure regulating valve 21 such as an electromagnetic proportional value is used as a pressure adjusting means for the supplied inert gas, a drain valve 23 may also preferably be used. When the drain valve 23 is closed as shown in FIG. 1 and the change-over valve 22 is switched to the rightward position, the inert gas is sealed in the mold cavity 15, and under this condition, when the molten resin is injected into the mold cavity 15, the inert gas is subjected to an adiabatic compression thereby to cause a temperature rise, which will then result in a temperature rise of the mold cavity 15. On the contrary, when the drain valve 23 is switched to the rightward position, the inert gas in the mold cavity 15 is exhausted in the atmosphere through a passage 10' formed in the stationary mold 11 thereby to reduce the pressure in the cavity 15, thus adjusting the pressure therein. During the injection molding operation, when the front end of the injection molten resin approaches the end portion of the mold cavity 15, the drain valve 23 is opened to release the inert gas therein into the atmosphere through the passage 10'.

According to this invention, since a high temperature and highly pressurized gas is preliminarily supplied to a mold cavity and controlled suitably, before or during a time when a molten resin is injected into the mold cavity, the difference between the temperatures, i.e. viscosities of the molten resin at the injection starting point and at the injection completing point becomes substantially zero, whereby mold products having excellent quality with substantially no defect such as cracks can be obtained.

What is claimed is:

1. A method of injecting a molten material into a mold cavity of an injection molding machine comprising a molding apparatus and an injection apparatus including a heating cylinder and an injection screw reciprocably located therein, comprising the steps of:
supplying and sealing a pressurized gas into the mold cavity before the start of an injection molding operation; and
controlling continuously a pressure of the pressurized gas supplied to said mold cavity in accordance with a position of said injection screw during the injection molding operation to maintain a temperature of said pressurized gas in said mold cavity higher than a softening temperature of the molten material to be injected whereby molten material injected into the mold cavity has substantially the same viscosity as that of the molten material before the injection.

2. The method according to claim 1 wherein a pressure of the pressurized gas to be supplied to said mold cavity is preliminarily programmed in accordance with at least one of an injection time elapsed, a position of the injection screw during the injection molding operation, a temperature of the molten material, and a pressure of the molten material.

3. The method according to claim 1 wherein said molten material is a molten ceramics.

4. The method according to claim 1 wherein said pressurized gas is an inert gas.

* * * * *